Figure 1:
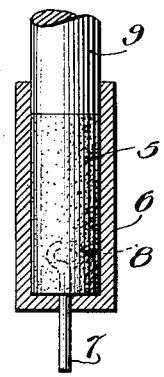

Sept. 12, 1933.   F. L. HUNTER, JR   1,926,336
ELECTRODE AND METHOD OF MAKING SAME
Filed Sept. 13, 1930

Inventor:
Frederick L. Hunter Jr.
By Williams, Bradbury
McCaleb & Hinkle.
Attys.

Patented Sept. 12, 1933

1,926,336

UNITED STATES PATENT OFFICE 1,926,336

ELECTRODE AND METHOD OF MAKING SAME

Frederick L. Hunter, Jr., Lake Bluff, Ill., assignor To Fansteel Products Company, Inc., North Chicago, Ill., a corporation of New York Application September 13, 1930
Serial No. 481,641

13 Claims. (Cl. 176—126)

This invention relates, in general, to gaseous conduction apparatus or vacuum tubes and has more particular reference to electrodes and a novel method of making the same for use in such apparatus or tubes.

It is generally known that the usual electrodes for use in gaseous conduction apparatus or tubes "sputter" considerably when operated in pure neon. Such sputtering of the electrodes causes the gradual depositing of the electrode material on the walls of the tube. This deposit or coating of electrode material occludes and imprisons the gas, thereby diminishing the gas pressure within the tube and causing the discharge between the electrodes to become more feeble or to cease altogether. Such a deposit or coating on the walls of the tube also acts as a condenser plate with nearby grounded objects and causes heating of the tube walls.

A prime object of the present invention is the production and provision of a novel electrode for gaseous conduction devices or vacuum tubes, which will overcome the foregoing objections.

An important object of the invention is the production and provision of a substantially non-sputtering electrode which will have a relatively low drop of potential when operated in a gaseous conduction device or tube.

A further important object of the invention is the provision of a composite electrode comprising an electrode material and a slightly volatile impurity for use in gaseous conduction devices or tubes, which will have a relatively long life.

Other objects and advantages of the invention will be apparent as the following description proceeds.

Figure 2:
Figure 3:
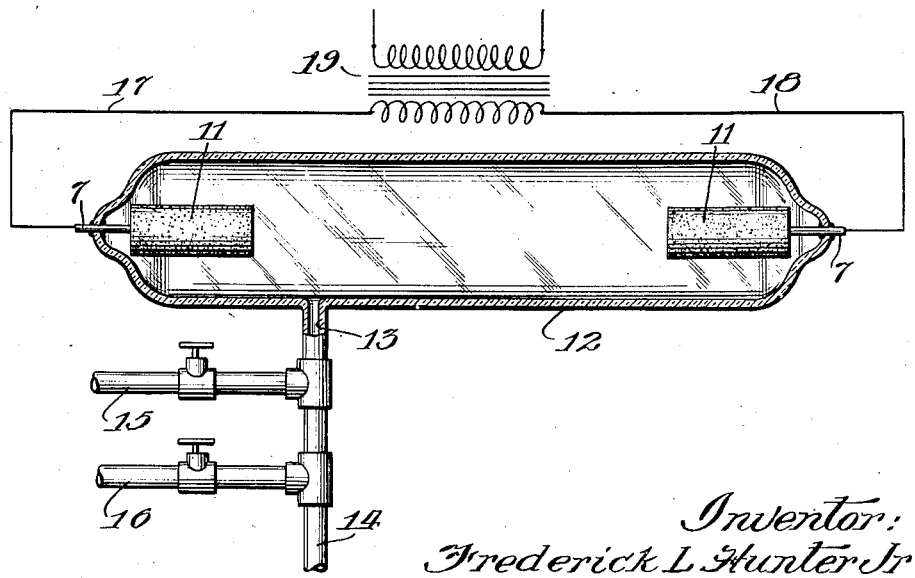

Referring to the drawing:

Figure 1 diagrammatically illustrates a step in the method of making the novel electrode of the invention;

Figure 2 is a transverse section through a hollow electrode made in accordance with the method of the invention; and Figure 3 is a longitudinal section through a gaseous conduction device or vacuum tube equipped with electrodes made in accordance with the invention.

I have found that the sputtering of electrodes in gaseous conduction devices may be greatly reduced or rendered ineffective by the introduction in the tube of such substances or impurities as mercury, in sufficient quantities to discolor the light of the tube. In the case of mercury, for example, it appears that some of the mercury is absorbed by the surface of the electrode and that the electrode acts as an electrode of mercury.

The introduction of these impurities causes color changes in the light of the tube and may impair its luminous efficiency. The present invention, therefore, contemplates the introduction of a slightly volatile impurity which does not discolor the light of the tube or gaseous conduction device and which reduces sputtering to a minimum or renders it ineffective.

Briefly, the present invention involves the production and provision of a novel and durable electrode for gaseous conduction devices, comprising a suitable electrode material such as that described in my co-pending application for United States Letters Patent, Serial No. 464,750, filed June 30, 1930, and a slightly volatile impurity such as an alkali metal or compound, or mixtures of such metals or compounds.

Illustrative of an at present preferred embodiment of the invention, a metal carbide powder is made by mixing a metalloid such as amorphous boron or carbon preferably in the form of lampblack or charcoal previously degasified by heat, with a powdered metal such as iron, copper, aluminum, silicon, tantalum, columbium, tungsten, or any other suitable electrode material. Preferably, however, as described in the above mentioned application, the metal here employed has a low vapor pressure such as tantalum, columbium, or other refractory metals.

As provided by my prior application, the refractory metal and metalloid powders are chemically combined and thoroughly degasified. To this refractory metal carbide, such as tantalum carbide, I add a slightly volatile substance which will not discolor the light of the tube. The alkali metals and the alkali or rear earths and the compounds thereof, such as the salts and oxides, provide such a substance. This mixture of the carbide and the volatile substance may be pressed to form and heated in a vacuum to degasify the electrode formed thereby. Preferably, however, I add a bonding agent which has a low melting point and which will not discolor the light of the tube. The low melting point alkali compounds such as compounds of lithium provide an excellent bond material for the electrode of the invention.

Accordingly, substantially 88% by weight of powdered tantalum carbide is mixed with substantially 12% by weight of a powder comprising caesium or rubidium chloride or a mixture of caesium chloride and rubidium chloride, and lithium carbonate as a binder for the carbide and chloride powders. The invention, however, is not limited by such a proportion, for if desired, equal parts of caesium and rubidium chlorides or any other suitable alkali compound making up as much as 20% by weight of the mixture and up to 5% of a lithium compound such as lithium carbonate may be mixed with from 75% to 99% tantalum carbide to provide a powder 5 which is placed in a shaping die 6. A lead wire or conductor 7, having an end 8 formed as a loop or ring, is previously positioned in the die 6 so that the loop or ring 8 will be imbedded in the powder.

Sufficient pressure is applied in any suitable means, such as that schematically shown at 9 in Figure 1, to press the powder into a solid body 11 which may be handled. After pressing the powder to the desired size and shape, it is heated by any suitable means in a vacuum to from 800° to 900° C. in order to degasify the body and to cement the powders into a body.

The body 11 having the conductor 7 extending therefrom may then be mounted in a tube or envelope 12, as shown in Figure 3, for flashing or arcing. The tube 12 may be exhausted through a tubular port or extension 13 which is connectible with a controlled vacuum pump (not shown) by means of a tubulation stem 14 communicating with the port 13, and with a controlled source or sources of gas (not shown) by means of connections 15 and 16.

The lead wires or conductors 7 are connected by means of conductors 17 and 18 to a suitable source of electrical potential 19 for establishing an arc between the bodies 11 and for degasing the tube and walls thereof.

Where desired, as illustrated in Figure 2, the electrodes formed from the powdered mixture as above described may be provided with a longitudinal bore 21 in order to further reduce or nullify the effects of sputtering, thus providing a hollow cylindrical electrode 22. A considerable portion of the material sputtered by such an electrode is deposited within the bore 21. It will be apparent that the effects of such sputtering are substantially negligible.

During the arcing process, the gases readily come out of these electrodes at relatively low temperatures. The tube 12 is filled with the desired gas such as neon after the arcing between the electrodes, and is sealed for service. Tests have shown that tubes equipped with these electrodes operate smoothly with no discoloration of the light and with substantially no flickering.

The discharge from such electrodes is of the type known as a cold discharge as distinguished from electrodes of the thermal emitter type. Tubes or signs provided with these electrodes have an exceedingly low electrode drop of potential and have very low starting and operating potentials. Moreover, it has been observed that the electrodes are relatively free from sputtering and serve to prolong the life of the tube by virtue of the non-sputtering property of the electrodes.

While I have illustrated and described a preferred embodiment of my invention, many modifications may be made without departing from the spirit of the invention and I do not wish to be limited to the precise details of construction set forth but desire to avail myself of all changes within the scope of the appended claims.

Having thus described my invention, what I claim is:

1. An electrode for gaseous conduction devices comprising carbonized tantalum and salts of alkali metals.

2. An electrode for gaseous conduction apparatus comprising tantalum, carbon and salts of lithium and casein.

3. An electrode for gaseous conduction devices comprising a refractory metal carbide, less than 20% by weight of an alkali compound, and lithium carbonate as a bond for the electrode.

4. An electrode for gaseous conduction devices comprising substantially 88% tantalum carbide and 12% of a mixture of rubidium chloride, caesium chloride, and a lithium salt, said lithium salt providing a bond for said mixture and said tantalum carbide.

5. An electrode for gaseous conduction devices comprising tantalum carbide and a volatile substance mixed and pressed therewith.

6. An electrode for gaseous conduction devices comprising tantalum carbide and a volatile substance mixed and pressed therewith, said substance including caesium chloride.

7. An electrode for gaseous conduction devices comprising 88% of a carbonized refractory metal and 12% of a mixture of alkali metal salts.

8. An electrode for gaseous conduction devices comprising degasified tantalum carbide, a mixture of rubidium and caesium chloride, and lithium carbonate bonding the chlorides and said tantalum carbide.

9. An electrode for gaseous conduction devices comprising tantalum carbide, a salt of an alkali metal and from 1 to 5% by weight of lithium carbonate.

10. An electrode for gaseous conduction devices comprising tantalum carbide and more than 1% of an alkali compound mixed and pressed therewith.

11. A non-sputtering electrode for gaseous conduction devices comprising from 75 to 99% tantalum carbide, from 1 to 20% of a mixture of alkali metal salts and from 1 to 5% lithium carbonate mixed and pressed with said carbide and said mixture.

12. A method of making electrodes which comprises pressing a carbonized refractory metal and salts of alkali metals into a body and establishing an arc between the mixture and an electrode.

13. A method of making electrodes which comprises pressing a mixture of tantalum carbide, lithium carbonate and an alkali metal compound into a body, degasifying the body and establishing an arc between said body and an electrode.

FREDERICK L. HUNTER, JR.